Sept. 29, 1959
C. H. McVEY
2,906,004
BROACH
Filed Aug. 9, 1956
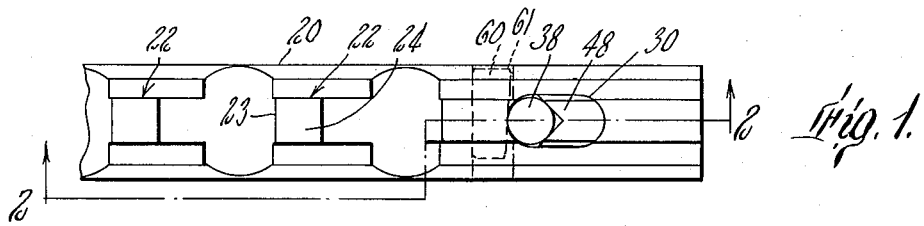
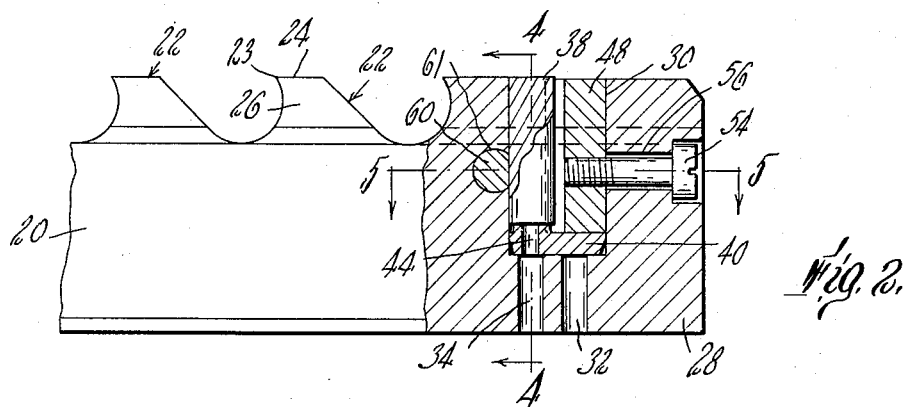
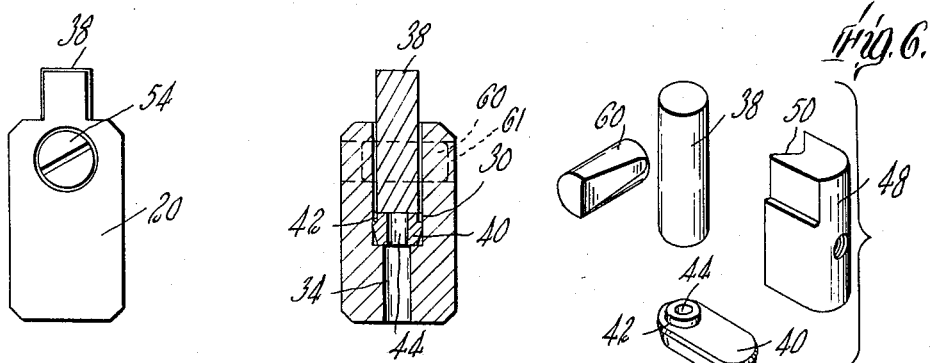
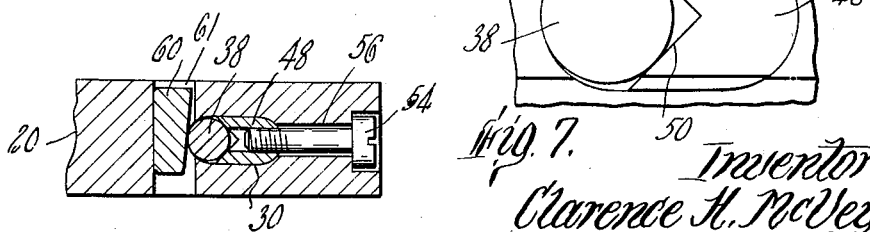
Inventor
Clarence H. McVey
by Maxwell Fish
Atty.

United States Patent Office 2,906,004
Patented Sept. 29, 1959

2,906,004

BROACH

Clarence H. McVey, Laconia, N.H., assignor to Scott & Williams, Inc., Laconia, N.H., a corporation of Massachusetts Application August 9, 1956, Serial No. 602,999

6 Claims. (Cl. 29—95.1)

The present invention relates to an improvement in broaches.

Broaches of the general type herein referred to consist in general of a steel bar having a series of progressively higher teeth or cutting edges formed along the length of one edge of the bar thereof, and may further be provided at the butt end thereof with burnishing surfaces for imparting a final polish or finish to the walls of the keyway or slot formed by the broach.

The broach is conventionally formed with a series of teeth, each having the under face of the cutting edge relieved or undercut, and with the sides of the tooth similarly sloped inwardly from the cutting edge to assist in the cutting operation by avoiding contact of the non-cutting surfaces of the tooth with the walls of the aperture or slot formed thereby. The butt end of the broach may be formed with burnishing surfaces which are rounded to engage and smooth the walls of the formed aperture.

Difficulty has been experienced in securing broaches for commercial use which are adapted for cutting such keyways and slots of similar description to the very close tolerances which are frequently required. While the method of burnishing in connection with broaching is known and used to some extent in certain types of broaches, design of the burnishing implements has been such that particularly in the case of slots or keyways, the all-important feature of accurate sizing, after repeated use of the tool, has been lacking and the method consequently found to be generally unsatisfactory for commercial use. Conventional broaches utilized for fine work have been found to have a relatively short life because wear and repeated sharpening of the leading surface of the cutting edge tends to narrow slightly the width of the individual teeth and produce slots of less than required width.

It is a principal object of the present invention to provide a novel and improved broach which is well adapted for operation to extremely close tolerances, and which will have a substantially longer period of usefulness for the performance of a given operation than such broaches known in the prior art.

It is a further object of the invention to provide a novel and improved organization of a broach and a separate burnishing and sizing tool associated therewith which may be readily and securely assembled for the performance of a combined broaching, burnishing and sizing operation.

In carrying out the invention I provide a broach having mounted therein a combined burnishing and sizing tool which is separately constructed and finished, and is subsequently assembled and rigidly secured in an accurately adjusted operating position in the broach.

In the preferred form of the invention shown, a cylindrically shaped burnishing and sizing tool is provided which is made of a material preferably having a high degree of hardness and which is capable of taking a desired surface finish in the order of 14 micro inches. The preferred finish may be produced by first polishing the hard sizing cylinder, and thereafter, by subjecting the cylinder to a liquid honing operation which removes the polish. A suitable material, for example, may be tungsten carbide. The sizing cylinder operates with a high degree of efficiency following the cutting operation to smooth and press out the walls of the slot or keyway to the desired dimensions. It has been found further that accurate results continue to be obtained within extremely close tolerances or permissible limits of error over a greatly extended period of active life, even though the width of the teeth may have been reduced by repeated sharpenings and/or wear.

Further in accordance with the invention I provide a novel and improved construction and arrangement of the supporting and holding devices for the burnishing tool which is well adapted for the assembly of the tool in an accurately adjusted position in the broach.

With the above noted and other objects in view as may hereinafter appear, the several features of the invention consist also in the devices, combinations and arrangement of parts hereinafter described and claimed, which together with the advantages to be obtained thereby will be readily understood by one skilled in the art from the following description taken in connection with the accompanying drawings, in which Fig. 1 is a somewhat fragmentary plan view of a broach illustrating particularly the burnishing and sizing tool and the means for supporting it in position in the broach;

Fig. 2 is a view in side elevation taken on line 2—2 of Fig. 1 with portions of the broach sectioned to illustrate particularly the burnishing and sizing tool and supporting means therefor in the broach;

Fig. 3 is an end view looking from the right of the broach as shown, for example, in Fig. 2;

Fig. 4 is a sectional view taken on a line 4—4 of Fig. 2, the section being taken along the axis of the burnishing and sizing tool;

Fig. 5 is a sectional plan view taken on a line 5—5 of Fig. 2 illustrating particularly the devices for clamping the burnishing and sizing tool in position;

Fig. 6 is an exploded view of the burnishing and sizing tool and its associated supporting parts shown, for example, in Fig. 2; and Fig. 7 is a fragmentary plan view on an enlarged scale showing the relation of the sizing tool to its mounting means and the teeth.

Referring to the drawings a broach of a conventional type is shown at 20 comprising a steel bar having formed along one edge thereof a series of teeth 2. Each tooth is slightly sloped downward at 24 from the cutting edge 23 (see Fig. 2), and both sides 26 slope inwardly by a slight amount to avoid engagement of surface 24 and the sides 26 with the bottom and side walls respectively of the keyway or slot formed by the broach. The butt end 28 of the broach as shown in the drawings is formed with a vertically disposed sizing tool receiving aperture 30 in the form of an elongated slot which, as shown in Fig. 2, projects vertically downwardly from the cutting edge of the broach into the butt 28. The forward and rear ends of the aperture 30 are cylindrically rounded and the aperture at its inner end is connected with two holes 32, 34 which extend through to the opposite edge of the broach. The aperture 30 provides space for a block 48 which supports a cylindrically shaped sizing tool 38 which is constructed of an extremely hard material capable of taking a finish in the order of 14 micro inches, for example, tungsten carbide. The sizing cylinder 38 is arranged to project outwardly into the path taken by the teeth of the broach, the cylinder being of a diameter determined in accordance with the required width of the finished slot to engage with, burnish and simultaneously size the two opposite sides of the newly formed slot. The sizing cylinder is positioned depth-wise in the aperture 30 by means of a support 40 which is fitted into the inner end of the aperture 30 and is formed with a raised pad 42 which engages the inner end of the cylindrically shaped sizing tool. The height of the pad 42 is adjusted by grinding in order to position the sizing cylinder 38 depth-wise in the desired position. It will be further noted that the pad 42 and support 40 associated therewith have a hole 44 formed therein which is arranged to form a continuation of the hole 34 and together with hole 32 provides a convenient means to facilitate disassembly.

The sizing cylinder 38 is supported lengthwise of the broach against the thrust of a burnishing and sizing operation by means of an elongated V-shaped supporting member 48, the sides of which are ground sufficiently to provide a no-shake fit with the sides of the aperture 30. The supporting member 48 is of sufficient length so that its inner end engages against the support 40 and its outer end is just enough shorter than the sizing cylinder so as not to interfere in any way with the sizing operation.

As will be evident particularly from Fig. 6 of the drawings the supporting member 48 is provided with V-shaped surfaces 50 for engagement with the sizing cylinder 38, and at its opposite edge is cylindrically rounded to fit into the correspondingly rounded end of the aperture 30. The V-shaped supporting member 48 is held firmly in position against the rear end of the elongated aperture 30 by means of a clamping screw 54 which passes through an oversized hole 56 in the butt of the broach and is threaded into the member 48. The head portion of the screw 54 engages against a shouldered portion of the hole 56 and acts as the screw is tightened to draw the supporting member 48 rearwardly into firm engagement with the rear face of the aperture 30. The cylindrically shaped sizing cylinder 38 is then held rigidly in position by means of a wedge pin 60 which is forced into a transverse aperture 61 in the broach at the side of the sizing cylinder adjacent the final tooth.

In setting up the broach for operation it will be understood that a sizing cylinder 38 is selected having the proper diameter, depending on the material to be broached, to compress the side walls and thereby increase the width of the slot resulting from the action of the teeth, to the required dimension.

For working to the very close tolerances desired it will be understood that the greatest possible care must be taken in adjusting the position of the sizing cylinder 38 with relation to the teeth 22 of the broach. The vertical position of the sizing cylinder as previously pointed out may be controlled by the grinding of the pad 42. Similarly, accurate control of the lateral position of the sizing cylinder 38 with respect to the teeth 22 may be effected by grinding one side or the other of the V-shaped portion 50 of the sizing cylinder support 48 to insure equal compression of metal in each side wall.

The use of a burnishing and sizing tool having the cylindrical shape of the sizing cylinder 38 has the specific advantage that rotational adjustment of the tool in the broach may be made at any time to compensate for wear of the exposed burnishing and sizing surfaces thus greatly increasing the life of the tool.

The diameter of the sizing cylinder 38 is necessarily greater than the width of the teeth 22, and to permit the above-described operation of centering the cylinder with respect to the teeth, the width of the aperture must be greater than the diameter of the cylinder. These relationships are shown particularly in Fig. 7. The V support 48, as described, is of proper width to fit in aperture 30, but its upper end from the top down a distance at least equal to the effective height of the teeth 22, is reduced on both sides to a width of less than the width of the teeth.

The arrangement of a separate cylindrically formed burnishing and sizing tool which may be made, for example, from tungsten carbide together with the simple and at the same time effective devices disclosed for supporting and for clamping the sizing cylinder in adjusted position in the broach form one of the outstanding features of the present invention. The extremely hard and specially finished cylindrically formed sizing tool above set forth, having a diameter determined in accordance with the width of the slot being cut by the broach and the required width of the finished slot, provides a most efficient means for producing slots of extreme accuracy in quantities of pieces many times greater than heretofore found possible with conventional broaches.

The invention having been described what is claimed is:

1. A broach comprising a bar having a series of teeth formed integrally with said bar along the length of one side of the bar for cutting a slot having side walls, said teeth having the underfaces thereof undercut and the sides thereof sloped inwardly from the cutting edge, and a butt portion of said bar following said teeth having formed therein a burnishing and sizing tool receiving aperture, a cylindrically shaped burnishing and sizing tool of tungsten carbide supported within said aperture with a portion thereof in alignment with and following said teeth having a surface finish in the order of 14 micro inches, and having a diameter determined in accordance with the required width of the slot, whereby said required slot width is substantially maintained while the effective width of said cutting teeth is reduced by wear and repeated sharpening over an extended life of said broach and means positioning and securing said burnishing and sizing tool in said aperture with the axis of the tool upright in relation to the path taken by said teeth and centered in following alignment with said teeth.

2. A broach comprising a steel bar having a series of teeth formed integrally therewith along the length of one side of the bar for cutting a slot having side walls, said teeth having the underfaces thereof undercut and the sides thereof sloped inwardly from the cutting edge, and a butt portion of said steel bar following said teeth having formed therein a burnishing and sizing tool receiving aperture, a cylindrically shaped burnishing and sizing tool of tungsten carbide mounted in said aperture with a portion thereof in alignment with and following said teeth and having a diameter determined in accordance with the required width of the slot, whereby said required slot width will be substantially maintained while the effective width of the cutting teeth is reduced by wear and repeated sharpening over an extended life of said broach, and means securing said burnishing and sizing tool in said aperture in following alignment with said teeth.

3. A broach which comprises a bar having formed integrally with said bar along one edge thereof a series of teeth for cutting a slot having side walls, said teeth having the underfaces thereof undercut and the sides thereof sloped inwardly from the cutting edge and a butt portion of said bar following said teeth having formed therein a burnishing and sizing tool-receiving aperture, a cylindrically shaped burnishing and sizing tool of tungsten carbide supported within said aperture with a portion thereof in alignment with and following said teeth, whereby said required slot width is substantially maintained while the effective width of said cutting teeth is reduced by wear and repeated sharpening over an extended life of said broach, and means including an elongated V-shaped supporting member having a no-shake fit with said aperture and supporting said tool substantially along its entire length against the thrust of the broach cutting, burnishing and sizing operation.

4. A broach which comprises a bar having formed along one edge thereof a series of teeth and a butt portion of said bar following said teeth having formed therein a burnishing and sizing tool-receiving aperture in the form of an elongated slot projecting vertically downwardly from the cutting edge of the broach into the butt and with the forward and rear ends of the aperture cylindrically rounded, a hardened burnishing and sizing tool in the form of a sizing cylinder composed of a metal having the hardness and non-compressibility characteristics of tungsten carbide supported within said aperture with a portion thereof in alignment with and following said teeth, an elongated V-shaped sizing cylinder supporting member arranged in said aperture engaging with and supporting the sizing cylinder substantially along its length against the thrust of the sizing operation and having the rear edge thereof cylindrically rounded to engage the rear end of said aperture, a removable support within said aperture engaging the end of said cylinder for determining the vertical position of the sizing cylinder, and means clamping the sizing cylinder against said V-shaped supporting member in the aperture.

5. A broach which comprises a bar having formed along one edge thereof a series of teeth and a butt portion of said bar following said teeth having formed therein a burnishing and sizing tool-receiving aperture in the form of an elongated slot projecting vertically downwardly from the cutting edge of the broach into the butt, and the forward and rear ends of the aperture cylindrically rounded, a burnishing and sizing tool in the form of a hardened sizing cylinder composed of a metal having the hardness and non-compressibility characteristics of tungsten carbide supported within said aperture with a portion thereof in alignment with and following said teeth, an elongated V-shaped sizing cylinder supporting member having a no-shake fit in said aperture engaging with and supporting the sizing cylinder substantially along its length against the thrust of the burnishing and sizing operation, said supporting member having a cylindrically formed edge for engagement with the rear end of said aperture, a clamping screw extending between the butt and said supporting member securing the supporting member against the rear end of said aperture, and a wedge pin transversely mounted in said butt engaging the leading side of the sizing cylinder for clamping the sizing cylinder against the V-shaped supporting member in the aperture.

6. A broach which comprises a bar having formed along one edge thereof a series of teeth and a butt portion of said bar following said teeth having formed therein a burnishing and sizing tool-receiving aperture in the form of an elongated slot projecting vertically downwardly from the cutting edge of the broach into the butt, a hardened burnishing and sizing tool in the form of a sizing cylinder composed of a metal having the hardness and non-compressibility characteristics of tungsten-carbide supported within said aperture with a portion thereof in alignment with and following said teeth, said cylinder being of greater diameter than the width of said teeth and of less diameter than the width of said aperture for lateral adjustment in the aperture, an elongated V-shaped sizing cylinder supporting member arranged in said aperture engaging with and supporting the sizing cylinder substantially along its length against the thrust of the sizing operation, said supporting member being of a width providing a no-shake fit with said aperture and having the upper portion thereof of less width than said cylinder, means securing the supporting member against the rear end of the aperture, and means clamping the sizing cylinder against said V-shaped supporting member against the rear end of the aperture.

References Cited in the file of this patent

UNITED STATES PATENTS

| | | |
|---|---|---|
| 666,801 | Doolittle | Jan. 29, 1901 |
| 857,358 | Muller | June 18, 1907 |
| 908,804 | Rhoades | Jan. 5, 1909 |
| 1,360,558 | Mattsson | Nov. 30, 1920 |
| 1,402,508 | Lothrop | Jan. 3, 1922 |
| 1,535,028 | Muller | Apr. 21, 1925 |
| 1,730,942 | Oswald | Oct. 8, 1929 |
| 1,926,531 | Graham | Sept. 12, 1933 |
| 2,018,392 | Willink | Oct. 22, 1935 |
| 2,472,040 | Brookfield | May 31, 1949 |
| 2,585,166 | Phaneuf | Feb. 12, 1952 |
| 2,585,832 | Phaneuf | Feb. 12, 1952 |
| 2,674,029 | Johnson | Apr. 6, 1954 |
| 2,697,271 | Phaneuf | Dec. 21, 1954 |
| 2,730,793 | Anthony | Jan. 17, 1956 |
| 2,770,028 | Bonnafe | Nov. 13, 1956 |

FOREIGN PATENTS

| | | |
|---|---|---|
| 400,532 | Great Britain | Oct. 26, 1933 |